United States Patent
Barwicz et al.

(10) Patent No.: US 10,416,393 B2
(45) Date of Patent: *Sep. 17, 2019

(54) CONNECTOR FOR WAVEGUIDE AND ALIGNMENT METHOD

(71) Applicant: International Business Machines Corporation, Armonk, NY (US)

(72) Inventors: Tymon Barwicz, Yorktown Heights, NY (US); Yoichi Taira, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,872

(22) Filed: Oct. 6, 2017

(65) Prior Publication Data

US 2018/0039029 A1 Feb. 8, 2018

Related U.S. Application Data

(63) Continuation of application No. 15/375,396, filed on Dec. 12, 2016, now Pat. No. 9,857,539, which is a (Continued)

(30) Foreign Application Priority Data

Sep. 30, 2014 (JP) .................... 2014-200132

(51) Int. Cl.
*G02B 6/38* (2006.01)
*G02B 6/30* (2006.01)
*G02B 6/42* (2006.01)

(52) U.S. Cl.
CPC ............ *G02B 6/3885* (2013.01); *G02B 6/30* (2013.01); *G02B 6/4249* (2013.01); *G02B 6/4292* (2013.01)

(58) Field of Classification Search
CPC ....... G02B 6/30; G02B 6/3839; G02B 6/3885
See application file for complete search history.

(56) References Cited

U.S. PATENT DOCUMENTS 5,850,498 A * 12/1998 Shacklette ........... G02B 6/1221
385/129
8,534,927 B1 9/2013 Barwicz et al.
(Continued)

FOREIGN PATENT DOCUMENTS

JP 01111207 7/1989
JP 2009105838 4/1997
(Continued)

OTHER PUBLICATIONS

List of IBM Patents or Patent Applications Treated as Related.

*Primary Examiner* — Omar R Rojas
(74) *Attorney, Agent, or Firm* — Fleit Gibbons Gutman Bongini Bianco PL; Thomas S. Grzesik (57) ABSTRACT

Various embodiments are directed to a connector for coupling optical signals to a semiconductor device. In one embodiment, the connector includes a connector member having a recessed portion to arrange a plurality of waveguides formed side-by-side in a transverse direction. A backup member is arranged within the recessed portion interposing the plurality of waveguides between the connector member and the backup member. The recessed portion includes a plurality of ridges arranged in a staggered pattern relative to the plurality of waveguides for positioning the plurality of waveguides relative to the connector.

18 Claims, 7 Drawing Sheets

Related U.S. Application Data continuation of application No. 14/870,176, filed on Sep. 30, 2015, now Pat. No. 9,563,030.

(56) References Cited

U.S. PATENT DOCUMENTS

| | | |
|---|---|---|
| 8,545,108 B1 | 10/2013 | Barwicz et al. |
| 9,563,030 B2 | 2/2017 | Barwicz et al. |
| 2013/0136399 A1 | 5/2013 | Jubin et al. |

FOREIGN PATENT DOCUMENTS

| | | | |
|---|---|---|---|
| JP | 2001519045 | | 10/2001 |
| JP | 2003534568 | | 11/2003 |
| JP | 2005292379 | | 10/2005 |
| JP | 2007272159 | | 10/2007 |
| JP | 2008089879 | | 4/2008 |
| JP | 2010231092 | | 10/2010 |
| JP | 2010231092 A | * | 10/2010 |
| JP | 2010243946 | | 10/2010 |
| JP | 2011002709 | | 1/2011 |
| JP | 2011017933 | | 1/2011 |
| JP | 2013195462 | | 9/2013 |

\* cited by examiner

CONNECTOR FOR WAVEGUIDE AND ALIGNMENT METHOD

BACKGROUND

The present invention relates to an optical information transmission technology and, more specifically, to a connector for transmitting optical information between semiconductor devices, and to an optical waveguide alignment method.

The information processing speed of information processing devices such as computers has improved in recent years. However, as the quantities and types of information to be processed have increased, so have demands for further improvement in the processing speed of these information processing devices. Optical communication is able to handle large amounts of information transmission, and higher density packaging without adverse effects such as parasitic capacitance is anticipated. Therefore, silicon photonics devices have been proposed to convert electronic information signal into optical information signal for transmission.

Silicon photonics devices use optical fibers and waveguides such as planar waveguides to transmit information between devices. Various semiconductor devices using optical waveguides have been proposed. For example, a connector able to couple a wafer to an optical fiber has been proposed in U.S. Pat. No. 8,534,927 (Patent Literature 1) which includes a flexible cladding layer mounted on a support, and single-mode waveguides mounted on top of the cladding layer. U.S. Pat. No. 8,545,108 (Patent Literature 2) describes the coupling of a semiconductor device to a single-mode optical fiber by affixing a "body portion" to a wafer.

Japanese Laid-open Patent Application No. 2007-272159 (Patent Literature 3) describes a waveguide having an alignment core coming into contact with a portion of a ferrule main body. Japanese Laid-open Patent Application No. 2008-089879 (Patent Literature 4) describes a positioning portion formed by patterning the thin film used to form overcladding. Japanese Laid-open Patent Application No. 2005-292379 (Patent Literature 5) describes the positioning and fixing of an optical waveguide to a support using recess-and-protrusion mating.

Figure 6:
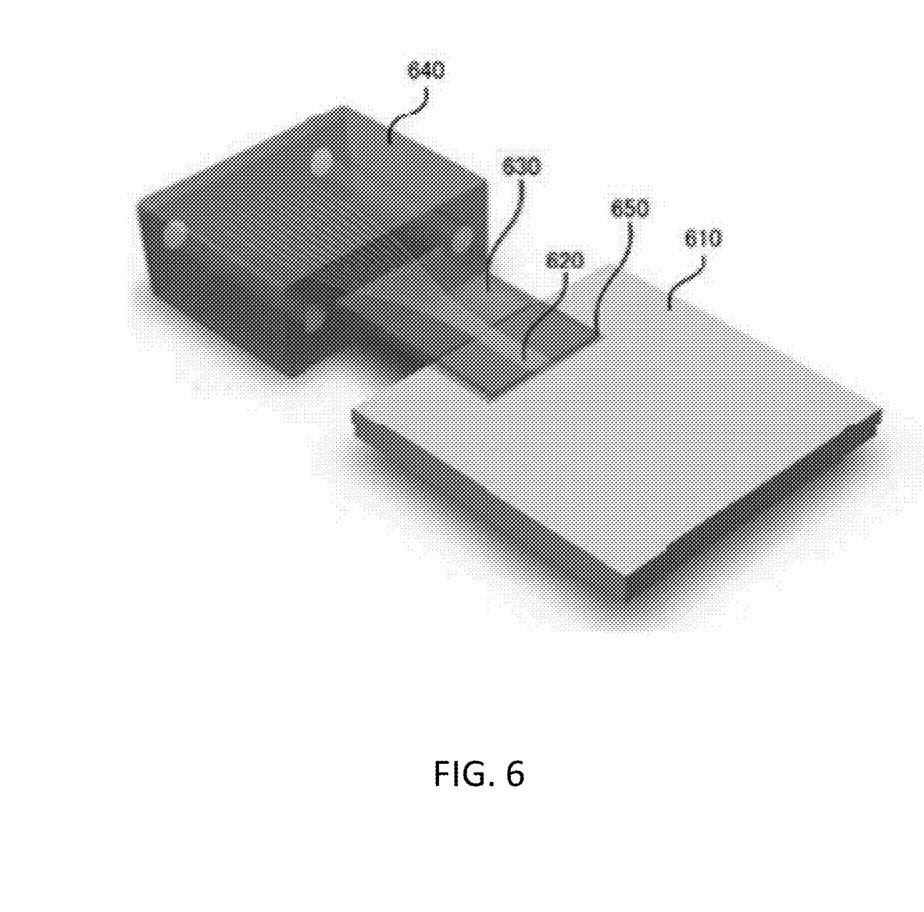
FIG. 6 is a perspective view showing the arrangement of a coupler of the prior art providing the optical coupling between an optical waveguide and a silicon photonics device.

All of these prior art techniques describe the coupling of a single-mode optical fiber to some type of semiconductor substrate. However, when optical signals are to be transmitted to a silicon photonics device, the optical signals inputted to and outputted from a silicon photonics device have to be coupled to a single-mode fiber bundle or waveguide bundle providing optical wiring. FIG. 6 shows conventional optical coupling between a silicon photonics device and a single-mode optical fiber bundle.

As shown in FIG. 6, an optical coupling is provided between a silicon wafer and a planar waveguide using an adiabatic optical coupling mechanism 620 via a coupling area formed on the output side of the silicon photonics device 610. The waveguide bundle is optically coupled using a polymer ribbon 630. The opposite end of the polymer ribbon 630 is held by a connector 640 or integrally formed with the polymer ribbon 630. The connector 640 holds the polymer ribbon 630 and is optically coupled to the optical output port of a silicon photonics device.

Figure 7:
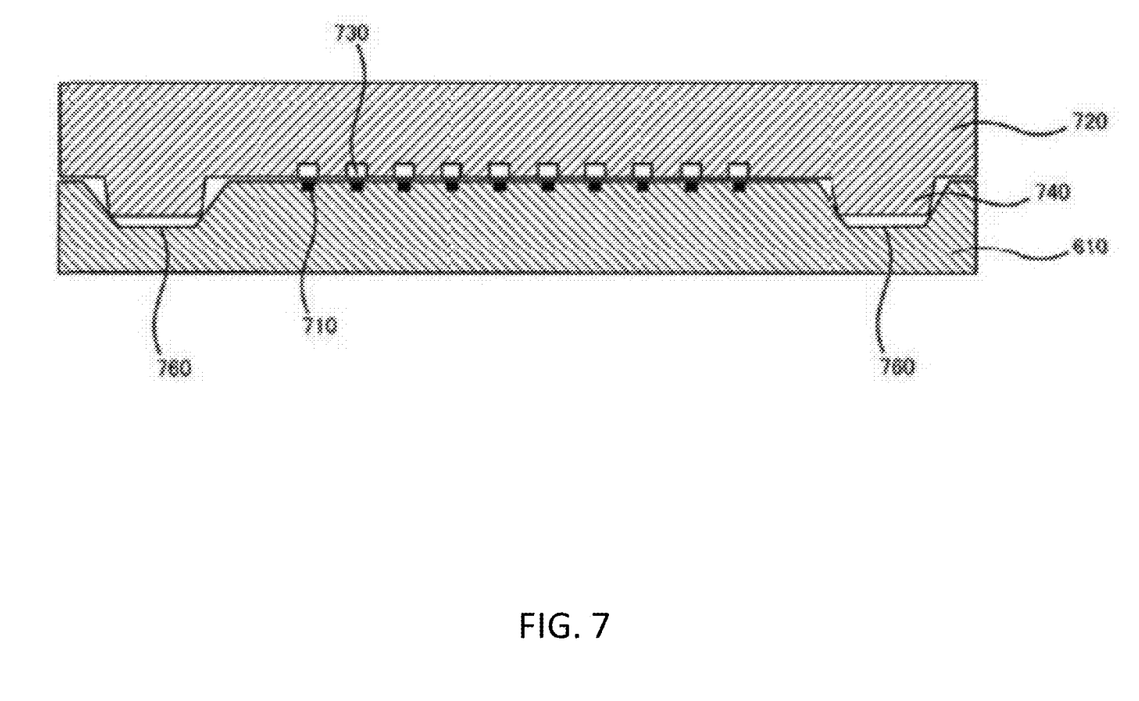
FIG. 7 is a view showing the cross-sectional structure of an optical output unit of a silicon photonics device 610 of the prior art.

FIG. 7 shows the cross-sectional structure of an optical output unit of a silicon photonics device 610 of the prior art. As shown in FIG. 7, the optical output unit of the silicon photonics device 610 is formed with silicon waveguides 710, and optical signals are coupled to the waveguides 730 formed in the polymer ribbon 720 via suitable coupling devices (not shown). The silicon waveguides 710 are formed in a silicon substrate using any thin-film or photolithographic technique common in the art.

The coupling devices connect a silicon photonics device 610 or optical signals from an external device to optical waveguides 730 and a silicon photonics device 610.

As shown in FIG. 7, alignment ridges 740 are formed on both sides of the polymer ribbon 720. Grooves 760 are formed in the silicon photonics device 610 in positions corresponding to the ridges 740, and the single-mode optical waveguides 730 and silicon waveguides 710 are positioned with respect to each other using these ridges and grooves.

While there have been various disclosures of the technology described above for positioning optical waveguides on a silicon wafer, the research on connectors that hold optical waveguides with precision in order to transmit optical information signals between silicon photonics devices has been anything but sufficient. Most connectors are made of a polymer material, and polymer ribbons are made of a suitably flexible polymer material. However, these polymer materials have insufficient dimensional precision in terms of thickness, width, etc. compared to inorganic materials even when thermosetting resins are used.

Also, when a plurality of waveguides are arranged side-by-side in a polymer ribbon 720, each of these waveguides has to be positioned with precision relative to the connector. In other words, a connector and alignment method are needed to be able to precisely align a polymer ribbon with a silicon photonics device.

SUMMARY OF THE INVENTION

In one embodiment, a connector for coupling optical signals to a semiconductor device. is disclosed. The connector comprises a connector member. The connector member comprises a recessed portion to arrange a plurality of waveguides formed side-by-side in a transverse direction. A backup member is arranged within the recessed portion interposing the plurality of waveguides between the connector member and the backup member. The recessed portion comprises a plurality of ridges arranged in a staggered pattern relative to the plurality of waveguides for positioning the plurality of waveguides relative to the connector.

In another embodiment, an electronic device is disclosed. The electronic device comprises a connected. The connector comprises a connector member. The connector member comprises a recessed portion to arrange a plurality of waveguides formed side-by-side in a transverse direction. A backup member is arranged within the recessed portion interposing the plurality of waveguides between the connector member and the backup member. The recessed portion comprises a plurality of ridges arranged in a staggered pattern relative to the plurality of waveguides for positioning the plurality of waveguides relative to the connector. The electronic device further comprises a semiconductor device coupled to the connector.

In yet another embodiment, an alignment method for coupling optical signals to a semiconductor device is disclosed. The method comprises arranging a connector member comprising a recessed portion to arrange a plurality of waveguides formed side-by-side in a transverse direction. The plurality of waveguides is arranged inside the recessed portion. A backup member is arranged within the recessed portion interposing the plurality of waveguides between the connector member and the backup member. The plurality of waveguides is supported with a plurality of ridges arranged in a staggered pattern relative to the plurality of waveguides to be formed in the recessed portion by reducing a distance between the backup member and the connector member.

DETAILED DESCRIPTION

The present invention has been devised in view of the prior art described above, and the object of the present invention is to provide a connector and alignment method able to align optical waveguides relative to a semiconductor device such as a silicon photonics device at a sufficient level, and to provide a connector for transmitting optical information between semiconductor devices, and an alignment method for optical waveguides in the connector.

The connector of the present invention includes a connector member having a recessed portion for arranging a plurality of waveguides formed side-by-side in the transverse direction. This connector member is fixed by a backup member arranged on the opposite side of the connector member to interpose the waveguides formed side-by-side in the transverse direction, and this fixes the waveguides relative to the connector.

The recessed portion has a plurality of ridges arranged in a staggered pattern relative to the waveguides for positioning the waveguides relative to the connector. These ridges are inserted between the waveguides arranged in staggered positions relative to the ridges, and support the waveguides.

The waveguides are formed in a polymer ribbon, and the surfaces on which the overcladding layer constituting the optical waveguides on the polymer ribbon has not been formed serve as stopping surfaces to the ridges. Because the ridges and the stopping surfaces on which the overcladding layer has not been formed come into contact with each other, the polymer ribbon can be positioned in the height direction along the transverse direction of the recessed portion.

The connector member also includes, in both end portions, a tapered ridge contacting a ridge formed in the polymer ribbon and positioning the polymer ribbon in the transverse direction, and the waveguides are configured as optical waveguides.

Figure 1:
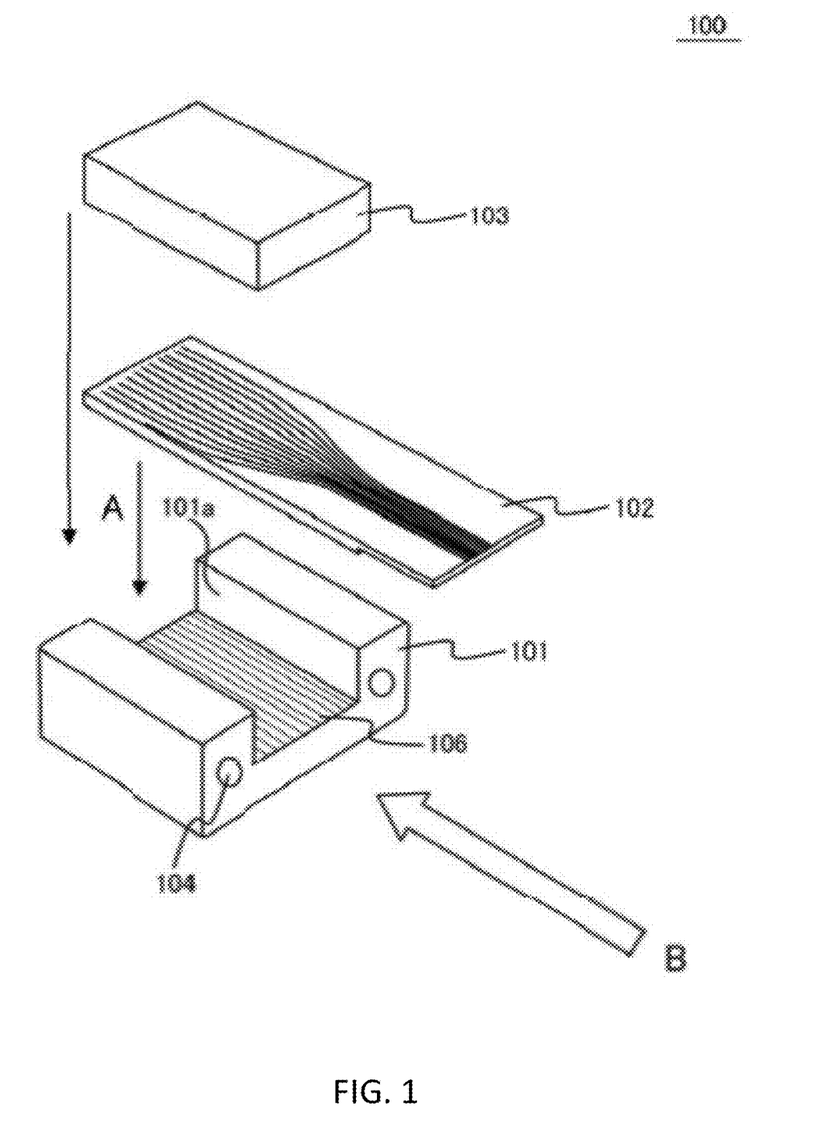
FIG. 1 is a schematic exploded perspective view of a connector 100 in an embodiment.

The following is an explanation of the present invention using an embodiment. The present invention is not restricted to the embodiment described below. FIG. 1 is a schematic exploded perspective view of a connector 100 in the embodiment. The connector 100 in the present embodiment has a shape that is compatible with mechanical transfer (MT) connectors used to couple optical fibers. The connector 100 has a connector member 101, a polymer ribbon 102, and a backup member 103 for securing the polymer ribbon 102 in the connector member 101.

The connector member 101 has a recessed portion 101a for accommodating and securing the polymer ribbon 102. An aperture 104 is formed in both side walls of the recessed portion 101a of the connector member 101 through which fixing members such as screws or metal rods are passed to connect the connector 100 to a silicon photonics device (not shown). By passing fixing members through the apertures 104 and securing the connector 100 to the case housing the silicon photonics device, the leading end of the polymer ribbon 102 is coupled to the silicon waveguides of the silicon photonics device. Also, as shown in FIG. 1, a plurality of ridges 106 for positioning the polymer ribbon 102 in the connector 100 are formed on the side of the recessed portion 101a accommodating the polymer ribbon 102 on the side facing the polymer ribbon 102.

The polymer ribbon 102 includes a plurality of optical waveguides having single-mode waveguide functions formed on the inside portion, and optical signals coming from the left side of the drawing become incident on the silicon photonics device arranged on the right side of the drawing. There are no particular restrictions on the material used to form the polymer ribbon 102. Any thermosetting or thermoplastic materials with good optical characteristics can be used. The optical waveguides formed in the polymer ribbon 102 include a core and cladding, and can be formed using any thin-film or photolithographic technique common in the art.

In the present invention, the optical waveguides formed in the polymer ribbon 102 are created by applying an overcladding layer to the polymer ribbon 102 to form protrusions at a predetermined interval in the surface of the polymer ribbon 102. The optical waveguides in the polymer ribbon 102 are formed in staggered positions relative to the ridges 106 formed in the recessed portion 101a of the connector member 101. Because the polymer ribbon 102 is fairly flexible, the side-by-side optical waveguides held by or integrated with the polymer ribbon 102 have to be positioned with great precision in the transverse direction of the connector 100.

The backup member 103 is made of a polymer material that is the same as or different from that of the connector member 101. The backup member 103 is fixed to the polymer ribbon 102 with the polymer ribbon 102 interposed between the recessed portion 101a of the connector member 101 and the backup member 103. When the polymer ribbon 102 is fixed to the connector 100, the top surfaces of the ridges 106 and the stopping surfaces of the polymer ribbon 102 come into contact. This contact is able to align the side-by-side waveguides with the optical input ports of the silicon photonics device with a precision of at most ±2.0 µm.

The connector member 101 and the backup member 103 are formed using precision injection molding, and can be made of a composite material including a suitable thermosetting resin and filler. The polymer ribbon 102 can be formed using any thin-film or photolithographic technique common in the art.

The connector 100 is formed by arranging the polymer ribbon 102 in the recessed portion 101a of the connector member 101, inserting the backup member 103 from above in the direction of Arrow A, applying pressure, and securing the members using a suitable adhesive. At this time, in the present embodiment, the top surface of the polymer ribbon 102 is supported and fixed to the top surfaces of the ridges 106 formed in the recessed portion 101a. As a result, the polymer ribbon 102 is secured to the connector 100 so that the optical waveguides with single-mode waveguide properties are supported in both the transverse direction and height direction.

Figure 2:
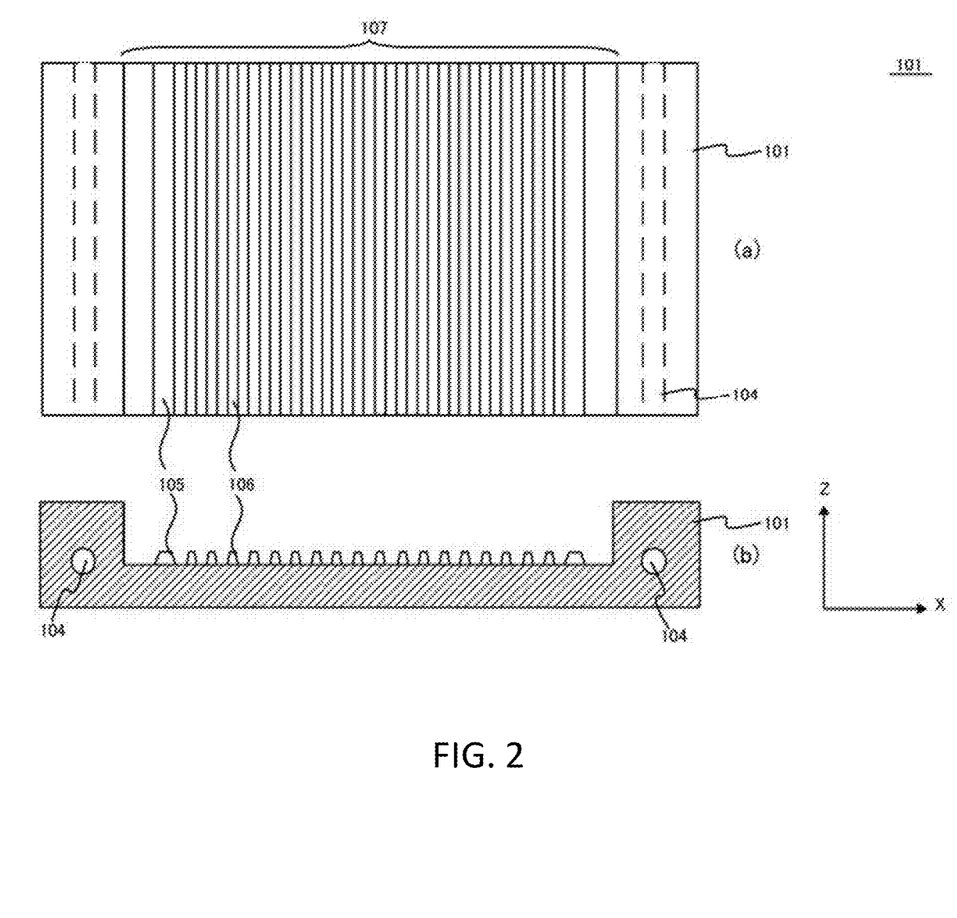
FIG. 2 is a top view from Arrow A in FIG. 1 (FIG. 2a) and a side view (FIG. 2b) from Arrow B in FIG. 1 of the connector member 101 constituting the connector 100 in the present embodiment.

FIG. 2 is a top view from Arrow A in FIG. 1 (FIG. 2a) and a side view (FIG. 2b) from Arrow B in FIG. 1 of the connector member 101 constituting the connector 100 in the present embodiment. A plurality of ridges 105, 106 used to support the polymer ribbon 102 are formed in the polymer ribbon contact portion 107 of the connector member 101. Ridges 105 are formed in both end portions of the polymer ribbon contact portion 107 to align the polymer ribbon 102 in the transverse direction (X direction) in the drawing.

Also, ridges 106 are arranged in the area in which the optical waveguides are formed in the polymer ribbon 102, but are formed in the portions where the optical waveguides are not formed. These ridges 106 are formed with flat tops and the tops are brought into contact with the stopping surfaces of the polymer ribbon 102 to position in the Z direction the optical waveguides formed side-by-side in the X direction.

The dimensions of each component in the embodiment explained herein are as follows. The size of the connector 100 is from 6.34 to 6.48 mm in the X direction, the ridges 106 are roughly 100 µm, and the interval is roughly 250 µm. The optical waveguides are formed with a planar waveguide shape at roughly 250 µm intervals. The height of the ridges 106 is on the order of dozens of micrometers, and the thickness of the planar waveguides is also on the order of dozens of micrometers. In the present embodiment, there are no particular restrictions on the dimensions of each component. These can be changed depending on the intended purpose or to conform to particular standards.

Figure 3:
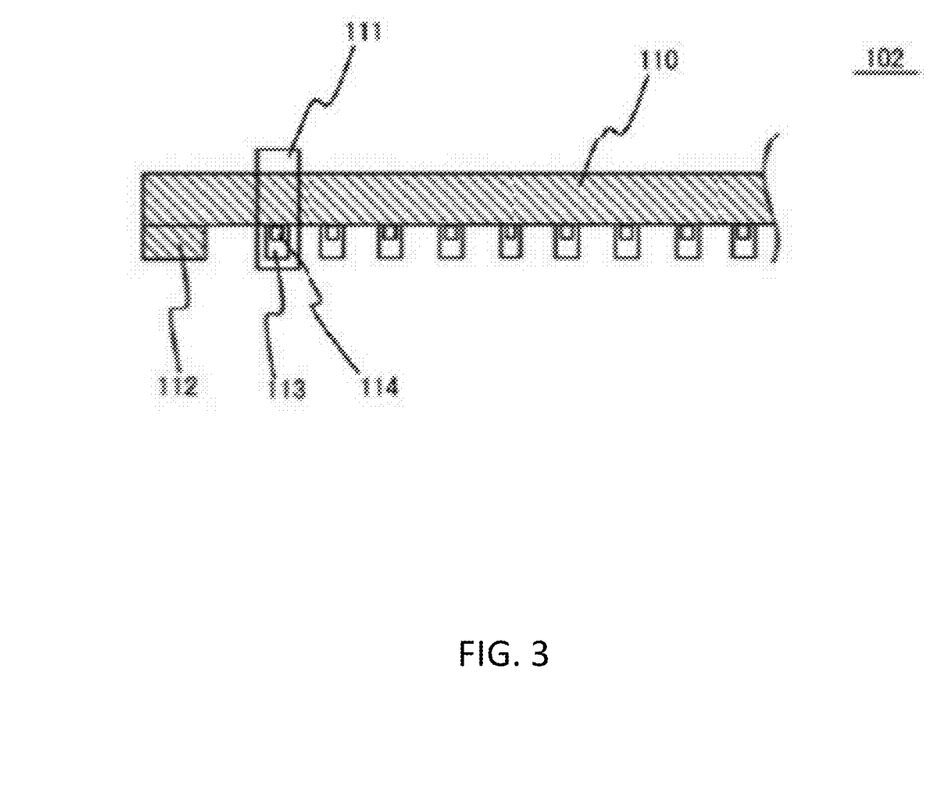
FIG. 3 is partially enlarged view showing the configuration of the polymer ribbon 102 in the embodiment.

FIG. 3 is a partially enlarged view showing the configuration of the polymer ribbon 102 in the embodiment. In the embodiment explained herein, the polymer ribbon 102 provides the functions of a cladding layer. The polymer ribbon 102 includes a base portion 110, positioning ridges 112, and optical waveguides (planar waveguides) 111 formed in the main part of the base portion 110. FIG. 3 is a partial enlargement. However, the structure shown in FIG. 3 extends to the opposite end of the connector member 101 (not shown).

In the embodiment explained herein, the optical waveguides are configured so that the base portion 110 functions as cladding, and cores 114 inside second cladding 113 formed on the base portion 110 are arranged on the base portion 110. A section of the base portion 110, a core 114, and second cladding 113 form a single optical waveguide 111. The top surfaces of the ridges 112 can be at the same level or at different levels as long as this does not have an adverse effect on the alignment in the Z direction.

Figure 4:
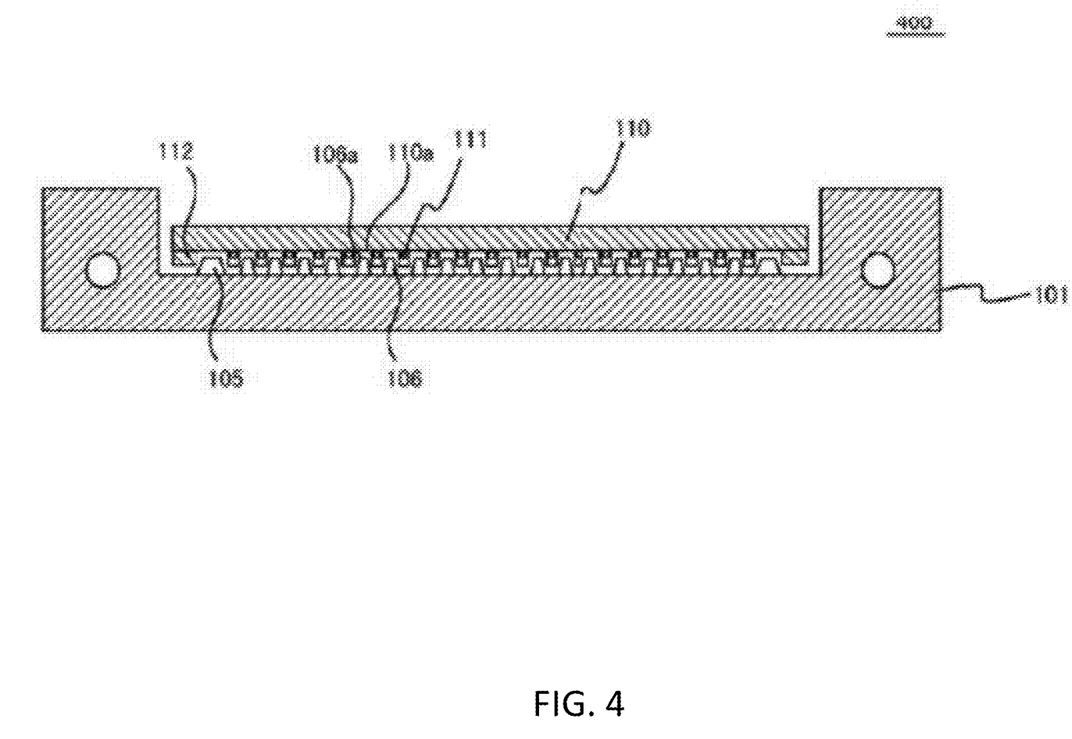
FIG. 4 is a view of an aspect 400 in which the polymer ribbon 102 has been arranged in the connector member 101 of the embodiment.

FIG. 4 is a view of an aspect 400 in which the polymer ribbon 102 has been arranged in the connector member 101 of the embodiment. As shown in FIG. 4, a gap remains between the polymer ribbon 102 and the connector member 101. The optical waveguides 111 formed on the polymer ribbon 102 are formed in staggered positions relative to the ridges 106 formed at fixed intervals in the connector member 101. A zigzag shape is formed by the gap between the ridges 106 and the optical waveguides 111.

When the polymer ribbon 102 is pressed into the recessed portion by the backup member 103, the stopping surfaces 110a defined as the surfaces in the base portion 110 between waveguides make contact with and are held by the top surfaces 106a of the ridges 106. This contact, as shown in FIG. 4, occurs over the entire recessed portion 101a of the connector member 101. As a result, the optical waveguides 111 are positioned with precision in the transverse direction and height direction (Z direction) of the connector member 101.

The ridges 105 make contact with the inner ends of the ridges 112 extending from the base portion 110, and the polymer ribbon 102 is positioned in the X direction. In order to make the positioning more reliable, the ridges 105 have tapered surfaces on both side, and the cross-sectional profile is that of a trapezoid extending from the connector member 101. When the tapered outer surface of these ridges 105 comes into contact with the inner surface of ridges 112, the polymer ribbon 102 can be positioned with respect to the connector member 101 in the transverse direction 102.

When a silicon photonics device has been positioned in this configuration by passing screws or metal rods through the apertures 104, the photocoupled portion of the silicon photonics device can be aligned with the optical waveguides 111 in the transverse direction of the polymer ribbon 102 with a precision of roughly ±2.0 µm, preferably ±1 µm.

Figure 5:
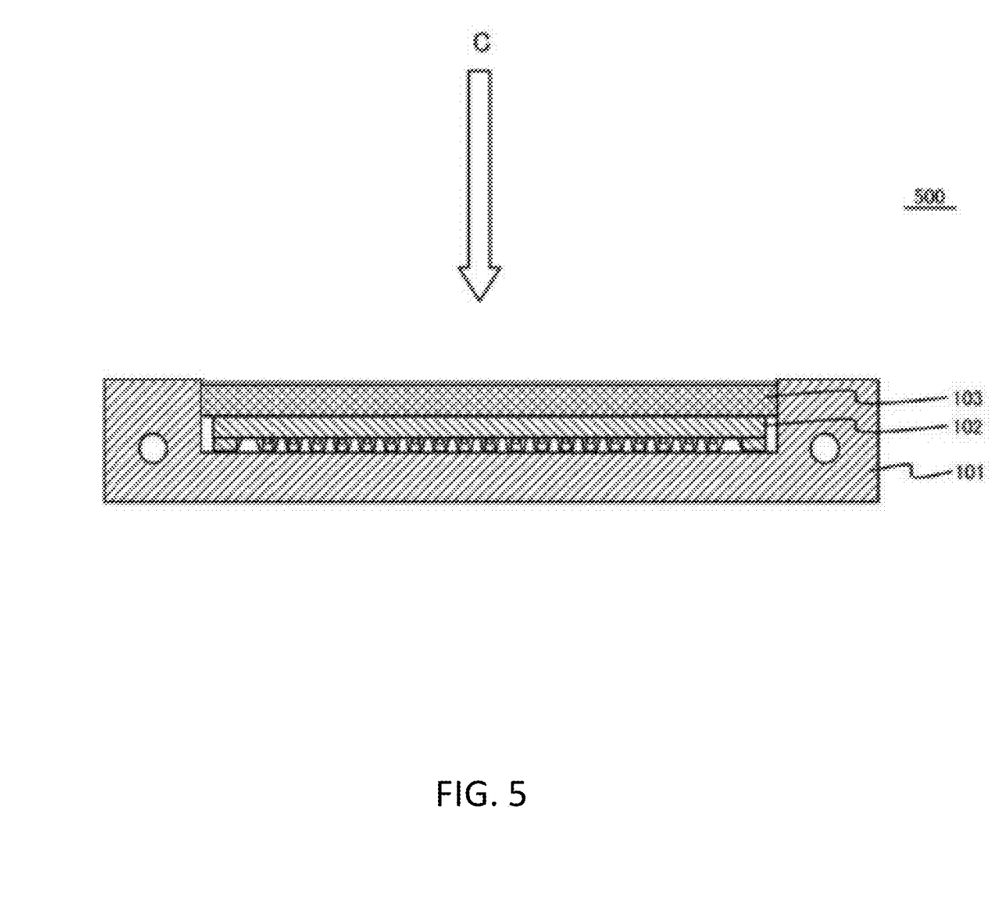
FIG. 5 is a view of an aspect 500 in which the backup member 103 has been forcibly inserted to form the connector 100 in the embodiment.

FIG. 5 is a view of an aspect 500 in which the backup member 103 has been forcibly inserted to form the connector 100 in the embodiment. After the polymer ribbon 102 has been arranged in the connector member 101 as shown in FIG. 4, the backup member 103 is placed in the polymer ribbon contact portion 107. Afterwards, pressure is applied from the direction of Arrow C to the backup member 103 on which a thermosetting, photocurable, or room temperature curable adhesive has been applied. The pressure applied to the backup member 103 reduces the gap between the connector member 101 and the polymer ribbon 102.

The pressure is stopped when the top surfaces 106a of the ridges 106 have come into contact with the stopping surfaces 110a of the base portion 110 of the polymer ribbon 102 where waveguides have not been formed. The forcible insertion may be stopped using any device or method common in the art. For example, the applied pressure may be monitored, or the moving stroke of the work may be monitored until it has been determined that the top surfaces 106a of the ridges 106 have come into contact with the stopping surfaces 110a of the polymer ribbon 102.

After forcible insertion has been ended, pressure continues to be applied until the members have been fixed by the adhesive. With this, the alignment of the polymer ribbon 102 in the connector 100 is complete. In the present embodiment, it was possible to align the polymer ribbon 102 with precision in both the X direction and the Z direction by simply aligning the surfaces of the polymer ribbon 102 which did not include an optical waveguide and which functioned as cladding in the Z direction. At this time, in the present embodiment, the height of the waveguides 111 from the bottom surface of the recessed portion 101a was uniform.

As explained above, the present invention is able to provide a connector and alignment method which can align optical waveguides with semiconductor devices such as silicon photonics devices with great precision.

The present invention was explained above with reference to the embodiment illustrated in the drawings. However, the present invention is not restricted to the embodiment illustrated in the drawings. It should be clear to those with skill in the art that other embodiments, and modifications such as additions, changes and omissions are possible within the scope of the claims to the extent that these embodiments and modifications exhibit the actions and effects of the present invention.

REFERENCE SIGNS LIST

100: Connector
101: Connector member
101a: Recessed portion
102: Ribbon
103: Backup member
104: Aperture
105: Ridge
106: Ridge
106a: Top surface
107: Ribbon contact portion
110: Base portion
110a: Stopping surface
111: Optical waveguide
112: Ridge
113: Second cladding
114: Core

What is claimed is:

1. A connector for coupling optical signals to a semiconductor device, the connector comprising at least:
a connector member comprising a recessed portion, wherein the recessed portion arranges a plurality of waveguides formed side-by-side in a transverse direction, each waveguide of the plurality of waveguides being surrounded by an individual cladding layer separated from one or more adjacent waveguides by a surface of a base portion of a polymer ribbon comprising the plurality of waveguides, wherein the base portion is a cladding layer that is separate from the individual cladding layer surrounding each waveguide in the plurality of waveguides, the polymer ribbon further comprising positioning ridges formed from the base portion, and
wherein the recessed portion comprises a plurality of ridges arranged in a staggered pattern relative to the plurality of waveguides for positioning the plurality of waveguides relative to the connector, wherein each ridge in the plurality of ridges is configured to contact a surface of a base portion of the polymer ribbon.

2. The connector according to claim 1, wherein the plurality of waveguides is formed in the polymer ribbon in a staggered position with respect to the plurality of ridges.

3. The connector according to claim 2, wherein each of the plurality of ridges utilizes the surface that is without a cladding layer as a stopping surface, thereby positioning the polymer ribbon in a height direction along the transverse direction of the recessed portion.

4. The connector according to claim 2, wherein the connector member further comprises at least one tapered ridge contacting a ridge formed in the polymer ribbon and positioning the polymer ribbon in a transverse direction.

5. The connector according to claim 4, wherein each of the plurality of waveguides is an optical waveguide.

6. The connector according to claim 1, further comprising:
a first aperture formed within a first wall of the recessed portion; and
a second aperture formed within a second wall of the recessed portion.

7. The connector according to claim 1, wherein the polymer ribbon comprises positioning ridges and optical waveguides formed in the base portion.

8. The connector according to claim 7, wherein a surface of the positioning ridges contacts a surface of the recessed portion.

9. An electronic device comprising:
a connector, wherein the connector comprises at least:
a connector member comprising a recessed portion arranging a plurality of waveguides formed side-by-side in a transverse direction, wherein each waveguide of the plurality of waveguides is surrounded by an individual cladding layer separated from one or more adjacent waveguides by a surface of a base portion of a polymer ribbon comprising the plurality of waveguides, wherein the base portion is a cladding layer that is separate from the individual cladding layer surrounding each waveguide in the plurality of waveguides, the polymer ribbon further comprising positioning ridges formed from the base portion, and
wherein the recessed portion comprises a plurality of ridges arranged in a staggered pattern relative to the plurality of waveguides for positioning the plurality of waveguides relative to the connector, wherein each ridge in the plurality of ridges is configured to contact a surface of the base portion of the polymer ribbon.

10. The electronic device according to claim 9, wherein the plurality of waveguides is formed in the polymer ribbon in a staggered position with respect to the plurality of ridges.

11. The electronic device according to claim 10, wherein each of the plurality of ridges utilizes the surface of the base portion as a stopping surface, thereby positioning the polymer ribbon in a height direction along the transverse direction of the recessed portion.

12. The electronic device according to claim 10, wherein the connector member further comprises at least one tapered ridge contacting a ridge formed in the polymer ribbon and positioning the polymer ribbon in a transverse direction.

13. The electronic device according to claim 12, wherein each of the plurality of waveguides is an optical waveguide.

14. The electronic device according to claim 9, further comprising:
a first aperture formed within a first wall of the recessed portion; and
a second aperture formed within a second wall of the recessed portion.

15. The electronic device according to claim 9, wherein the polymer ribbon comprises optical waveguides formed in the base portion.

16. An alignment method for coupling optical signals to a semiconductor device, the method comprising:
arranging a connector member comprising a recessed portion to arrange a plurality of waveguides formed side-by-side in a transverse direction, wherein each waveguide of the plurality of waveguides is surrounded by an individual cladding layer separated from one or more adjacent waveguides by a surface of a base portion of a polymer ribbon comprising the plurality of waveguides, wherein the base portion is a cladding layer that is separate from the individual cladding layer surrounding each waveguide in the plurality of waveguides, the polymer ribbon further comprising positioning ridges formed from the base portion;
arranging the plurality of waveguides inside the recessed portion; and supporting the plurality of waveguides with a plurality of ridges arranged in a staggered pattern relative to the plurality of waveguides,
wherein the supporting situates each ridge in the plurality of ridges in contact with the surface of the base portion of the polymer ribbon without a cladding layer.

17. The alignment method according to claim 16, wherein the plurality of waveguides is formed in the polymer ribbon in a staggered position relative to the plurality of ridges, and wherein supporting the plurality of waveguides further comprises the inserting the plurality of ridges between the plurality of waveguides.

18. The alignment method according to claim 16, wherein each of the plurality of waveguides is an optical waveguide.

* * * * *